US006980890B1

(12) United States Patent
Cassara' et al.

(10) Patent No.: US 6,980,890 B1
(45) Date of Patent: Dec. 27, 2005

(54) METHOD FOR DESIGNING A POWER FACTOR CONTROLLER APPARATUS

(75) Inventors: Salvatore Cassara', Como (IT); Carlo Gemme, Pavia (IT); Andrea Moratto, Milan (IT); Richard Tinggren, Thawil (CH); Giuliano Corbetta, Milan (IT)

(73) Assignee: ABB Technology AG, Zurich (CH)

( * ) Notice: Subject to any disclaimer, the term of this patent is extended or adjusted under 35 U.S.C. 154(b) by 70 days.

(21) Appl. No.: 10/149,612

(22) PCT Filed: Oct. 25, 2000

(86) PCT No.: PCT/EP00/10720

§ 371 (c)(1),
(2), (4) Date: Sep. 27, 2002

(87) PCT Pub. No.: WO01/45227

PCT Pub. Date: Jun. 21, 2001

(30) Foreign Application Priority Data

Dec. 14, 1999  (EP) ................................. 99204297

(51) Int. Cl.$^7$ .............................................. G05F 1/70
(52) U.S. Cl. .................... 700/286; 323/206; 323/207; 323/204; 323/222
(58) Field of Search ....................... 700/286; 323/206, 323/207, 204, 222

(56) References Cited

U.S. PATENT DOCUMENTS

| | | | | |
|---|---|---|---|---|
| 4,352,156 A | * | 9/1982 | Gyugyi ...................... | 363/163 |
| 5,134,355 A | * | 7/1992 | Hastings ..................... | 323/211 |
| 5,283,726 A | * | 2/1994 | Wilkerson ................... | 363/41 |
| 5,656,923 A | * | 8/1997 | Schultz et al. .............. | 323/207 |
| 5,724,786 A | * | 3/1998 | Singh et al. ................. | 53/52 |
| 5,804,950 A | * | 9/1998 | Hwang et al. ............... | 323/222 |
| 6,034,513 A | * | 3/2000 | Farrington et al. .......... | 323/222 |
| 6,239,960 B1 | * | 5/2001 | Martin ......................... | 361/86 |

FOREIGN PATENT DOCUMENTS

| | | | | |
|---|---|---|---|---|
| EP | 000949738 A2 | * | 6/1999 | ............. H02J 3/18 |
| EP | 0 949 738 A2 | | 10/1999 | |
| JP | 2000308263 A | * | 11/2000 | ............. H02J 3/18 |

OTHER PUBLICATIONS

"An expert system for reactive power control of a distribution system"—Salama et al. IEEE Apr. 1992.*
"Design of shunt capacitor circuits for power factor compensation in electrical systems supplying non-linear loads: a propbabilistic approach"-Cavalinni et al, IEEE Jul. 1998.*
"A PLC Based Power Factor Controller for a 3-Phase Induction Motor"-Ali et al, IEEE 2000, Ain-Sharns University, Cairo, Egypt.*

(Continued)

Primary Examiner—Albert W. Paladini
Assistant Examiner—Michael D. Masinick
(74) Attorney, Agent, or Firm—Connolly Bove Lodge & Hutz LLP

(57) ABSTRACT

A method for designing a power factor controller apparatus for a power distribution network comprising the phases of: configuring, in a predefined computerised support, an interactive computerised environment (2) dedicated to the management of data and/or programming commands (reference 1); and acquiring, in said interactive computerised environment, data related to said power factor controller apparatus (reference 3); and acquiring and/or calculating, in said interactive computerised environment, data related to the power distribution network (reference 4) wherein said power factor controller apparatus is installed; and based on said phase e), calculating, in said interactive computerised environment, the optimal chasing of a power factor target for said power factor controller apparatus (reference 5).

12 Claims, 1 Drawing Sheet

OTHER PUBLICATIONS

Figure 1:
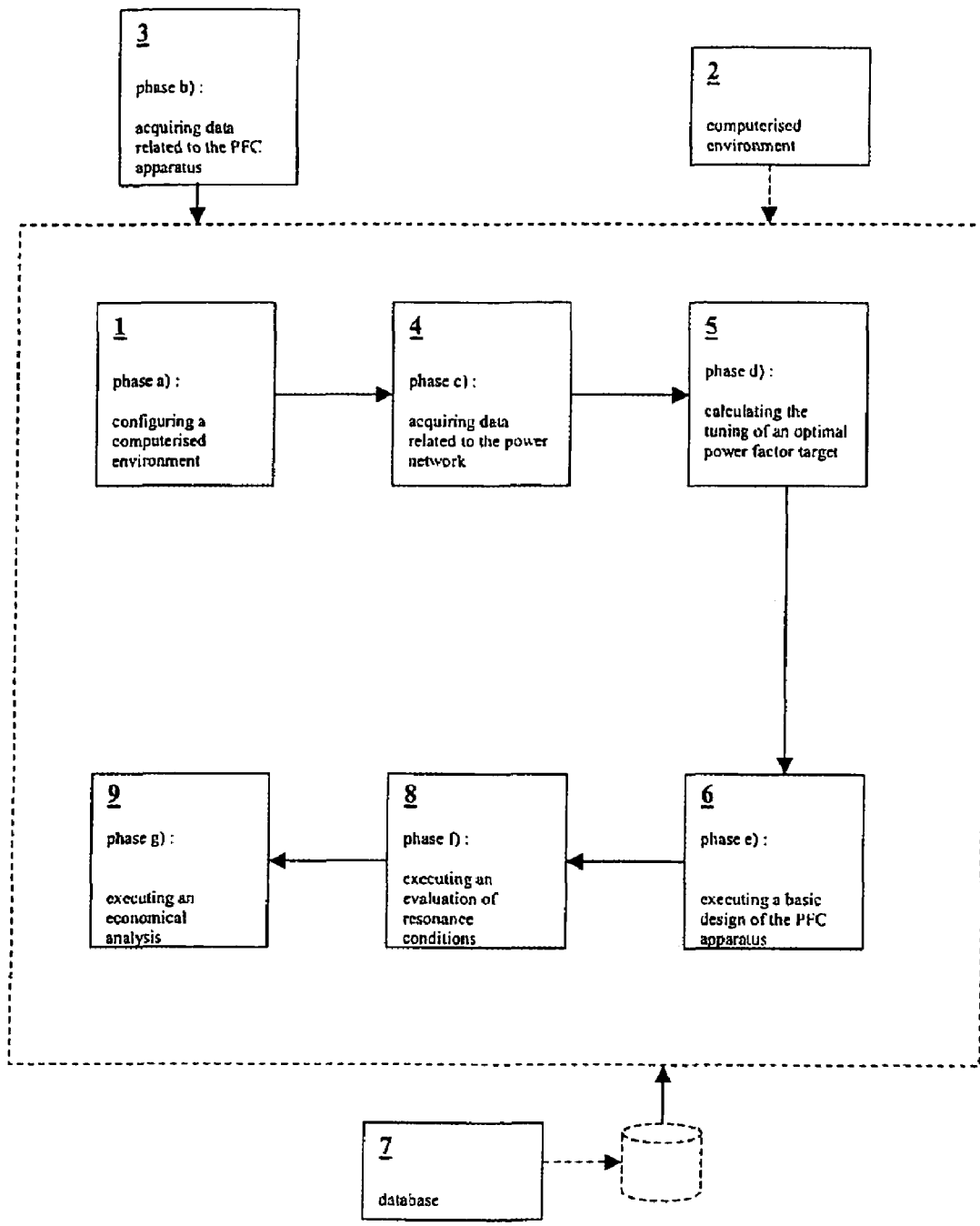

"Power Factor Controller—An Integrated Power Quality Device"-Tingren et al, IEEE, 1999.*

"A Microprocessor-Based Power Factor Controller"-Mandal et al, Jadvpur University, Calcutta, IEEE 1994.*

Salama et al, An Expert System for Reactive Power Control of a Distribution System, Part 1: System Configuration, *8047c IEEE Transactions on Power Delivery 7* (1992)Apr., No. 2, New York.

Cavallini et al, Design of Shunt Capacitor Circuits for Power Factor Compensation in Electrical Systems Supplying Nonlinear Loads: A Probabilistic Approach, *IEEE Transactions on Industry Applications 34*, No. 4, Jul./Aug. 1998: 675-680.

* cited by examiner

METHOD FOR DESIGNING A POWER FACTOR CONTROLLER APPARATUS

DESCRIPTION

The present invention relates to a method for designing a power factor controller apparatus for a power distribution network.

Power factor controller (PFC) apparatuses are well known in the state art. These apparatuses have been introduced in order to improve the so-called "Power Quality" of a power distribution network. With this term, it is commonly meant a management of the power distribution network, aimed at avoiding problems related to current, voltage or frequency deviations that would result in a failure. It is known that, for achieving a satisfactory power quality, it is essential the control of the power factor of the apparatuses installed in the power distribution network. The power factor is controlled providing a suitable amount of reactive power. Because providing reactive power from the power distribution network is expensive to the user, a PFC apparatus comprises generally a certain number of capacitor banks in order to provide locally the suitable level of reactive power. Such capacitor banks are connected/disconnected to the power distribution network in a controlled manner, so as to ensure a suitable control of the power factor.

Obviously, the use of PFC apparatuses is important, particularly when a worsening of the power quality, due to the reactive power required during network operation is experienced. A common example of a PFC apparatus can be a medium voltage switchboard (i.e. for a voltage range from 1 kV to 35 kV), in which a suitable control of the power quality can ensure better performances of the whole switchboard and, above all, reduced costs for the user.

It is known that the design of a PFC apparatus is generally very complicated and requires many different phases. Generally, the main design activity, which has to be necessarily carried out, is the calculation of the optimal power factor chasing, given the main power distribution/utility requirements. Moreover, further design steps are generally run in order to ensure that the mentioned capacitor banks are managed correctly, so as to obtain a satisfactory performance of the whole apparatus. In particular, many studies are needed for controlling the presence of harmonic resonance or current transients.

Traditional design methods are characterised by some drawbacks.

Generally, the required design tasks are not executed in an integrated manner. In fact, because the design activities require different competencies, non-systematic procedures are often used. Therefore, any task is often executed separately from the whole context. So, it is difficult to share information and to re-use already tested solutions. These problems are enhanced if we consider that many different computerised tools are commonly used. Even these computerised tools are surely effective from a technical point of view, due to the fact that they can bring to very accurate solutions, they do not allow integrating the various design activities. Moreover, very often, these computerised tools cannot exchange information automatically, because they are frequently implemented in computerised environments that are not fully compatible. Obviously, all these facts imply an increase of the design time and costs and make difficult to optimise the design work-flow.

The lack of coordination of the design activities causes several problems of consistency of the technical solutions that are adopted. So, many tests on the field are often required, with a further increase of costs.

Also the activity of estimating the costs of the whole apparatus is made difficult because the presence of these uncertainties. Because the customer often requires a precise estimation of the costs, already in the proposal phase, it is required a remarkable effort, above all in terms of time.

Therefore, the main aim of the present invention is to provide a method for designing a power factor controller apparatus, which allows executing, with a remarkable reduction of time and costs, the main design tasks that are generally required.

Within this aim, another object of the present invention is to provide a method for designing a power factor controller apparatus, which allows executing all the main design tasks in an integrated manner, with the possibility of sharing easily information.

Another object of the present invention is to provide a method for designing a power factor controller apparatus, which allows using integrated computerised tools, in order to make possible an automatic transfer of the information.

Another object of the present invention is to provide a method for designing a power factor controller apparatus, which allows executing an easy cost estimation of the designed apparatus.

Not the least object of the present invention, is to provide a method for designing a power factor controller apparatus, which is very friendly to the user. Thus, the present invention provides a method for designing a power factor controller apparatus, for a power distribution network, comprising the following phases:
  a) configuring, in a predefined computerised support, an interactive computerised environment dedicated to the management of data and/or programming commands;
  b) acquiring, in the interactive computerised environment, data related to the power factor controller apparatus;
  c) acquiring and/or calculating, in the interactive computerised environment, data related to the power distribution network, in which the power factor controller apparatus is installed;
  d) based on the phase c), calculating, in the interactive computerised environment, the optimal chasing of a power factor target for the power factor controller apparatus.

The present invention allows achieving the intended aims and objects.

A unique computerised environment is used for executing the main tasks requested for the power factor controller apparatus design. In particular, the calculation and design the optimal power factor target achievement, in the predefined computerised environment, can be performed in an integrated manner, with automatic exchange of information and with the possibility of re-using already tested solutions or quickly performing subsequent optimisation steps. As, it will be described better hereinafter, the integration of the mentioned design phases bring to an important improvement of the entire design work-flow, with a remarkable reduction of time and costs.

Further characteristics and advantages of the invention shall emerge more clearly from the description of preferred but not exclusive embodiments of the method according to the present invention. The preferred embodiments of the method, according to the present invention, are illustrated purely by way of example and without limitation in the attached drawing, in which FIG. 1 is a diagram, which illustrates a schematic view of the main phases comprised in the method according to the present invention.

With reference to FIG. 1, the method according to the present invention comprises the phase a) (reference 1) of configuring, in a predefined computerised support, an interactive computerised environment (reference 2), dedicated to the management of data and/or programming commands.

As a computerised support, computerised systems commercially available can be used. The interactive computerised environment 2, can be, for example, provided with a configuration similar to WINDOWS® computerised environments, with the possibility of selecting, for the execution of programming commands, icons, toolbars, or dedicated windows. The phase 1 can be performed, using advantageously one of the computer configuration programs that are well known in the state of the art, or modifying a pre-existing configuration.

For example, the phase 1 can comprise the step of inserting information (project name, customer details, etc.), which concerns the specific project related to the power factor controller apparatus to be designed, so, as to make the computerised environment more friendly to the user.

The method, according to the present invention, provides also the phase b) (reference 3) of acquiring, in the interactive computerised environment 2, data related to the power factor controller apparatus. These data can be related, for example, to general boundary conditions and/or to specific requirements desired by the customer and to general requirements, imposed by standard regulations. Then, the phase c) (reference 4) of acquiring, in the interactive computerised environment 2, data related to the power distribution network is provided. Thanks to the computerised environment 2, this phase can be performed in a manner, which allows making all the information available to the subsequent phases.

Preferably, the phase 4, besides the obvious step of drawing the power distribution network schematics, comprises steps for calculating the most useful quantities, needed for describing the power distribution network. Advantageously, these steps may be the following:

- acquiring data related to the rated frequency and/or voltage of the power distribution network;
- acquiring data related to the short circuit power factor value of the power distribution network;
- calculating the short circuit power and/or the short circuit current and/or the short circuit impedance value, related to the power distribution network.

The phase d) (reference 5) of calculating, in the interactive computerised environment, the chasing of a optimal power factor target is then provided. Obviously, the customer suggests the power factor target, according to his needs. The calculation is based on the characteristic quantities of the power distribution network, as acquired and/or calculated in the previous phase 4. A step implemented in the phase 5 may preferably comprise the acquisition of the data related to the power distribution network, acquired and/or calculated in the phase 4. Then, it may be provided the step of acquiring data/values related to the load profile and dynamic (active and/or reactive power quantities). Then, based on the acquired data, it can be provided the step of executing a preliminary calculation of the power factor. Finally, it can be provided the step of executing, based on the mentioned preliminary calculation, an iterative procedure for optimising the chasing of the target power factor of the PFC apparatus.

The mentioned iterative optimising procedure is particularly advantageous, since it allows defining the structure of the capacitor banks used for controlling the power factor. In particular, the number and the size of the elements composing the PFC apparatus can be easily defined. In fact, this iterative optimising procedure comprises preferably the sub-steps of performing an approximation of the reactive power characteristic, related to the PFC apparatus, by using a target function. In this sub-step, a target function, which allows the user to maximise the performances of the PFC apparatus, at most convenient costs, is followed. The target function may preferably comprise a performance index, which allows using an iterative method for approximating the reactive power characteristic. Once the reactive power characteristic has been chosen, it is possible to define the composition of the PFC apparatus by performing the sub-step of selecting the optimal number of banks. Also this sub-step comprises, preferably, the execution of an iterative algorithm, for approximating an optimal index of performance. Then, it may be provided the step of selecting the optimal sequence of banks. Also this step provides advntageously an algorithm chasing a performance index.

It should be noticed that the described iterative procedure allows taking into account various constraints requested by the customer. In fact, the iterative procedure, comprising the described sub-steps, can be repeated in order to reach the best approximation of some specific requirements, concerning the capacitor banks. For example, it would be useful to consider a reduced number of capacitor banks or to size each bank in order to reduce the installation costs and time of the whole apparatus.

It should be noticed from the above description, that the method according to the present invention has a further important advantage.

In fact, it could be objected that a dedicated computerised tool can ensure a higher level of accuracy of the results obtained running a phase separately. Even this fact was true, the fact of having integrated the described phases in the same computerised environment, allows solving "a priori" many problems that, otherwise, should have been faced later, during the installation in the field. Maintaining, in the worst case, a reasonable level of accuracy, the fact of integrating the design phases allows saving a remarkable amount of time and costs in the design work-flow, bringing to technical solutions that will certainly be consistent and ready for the use.

In a preferred embodiment, the method according to the present invention comprises the phase e) (reference 6) of executing, in the interactive computerised environment 2, the basic engineering of the PFC apparatus. Accordingly to what described above, also this phase is advantageously run integrally to the previous ones. In particular, the results of phase 4 and 5 are extensively used acquiring first data related to the optimal power factor target achievement and acquiring second data related to the available components related to the power factor controller apparatus. In practice, a database 7 comprising the commercial components can be used for retrieving the second data. The first data and the second data (not shown) are used for executing a first basic engineering of the PFC apparatus. Then, the step of calculating the current transients, related to the PFC apparatus, is run. This step is particularly important, because it allows fixing important constraints related to the power factor controller apparatus. For this reason, an iterative procedure for optimising the PFC apparatus may be executed. In particular, the step of calculating the current transients comprises preferably the following sub-step of calculating first values of limiting reactance, related to a predefined capacitor bank considered in the first basic engineering, based on the reactance of the power distribution network and of the predefined capacitor bank. In this case, the calculations can be performed, using the known formulas provided by IEC 60871-1 standards. Accordingly, it may be comprised the step of calculating second values of limiting reactance, related to a predefined capacitor bank, based on the reactive power of the predefined capacitor bank and on the reactive power of the capacitor banks connected with the predefined capacitor bank. Also this phase can be used standard formulas that are known to the skilled artisan.

Finally, it may be comprised the step of selecting among the mentioned first values and the second values, related to a predefined bank capacitor, the values of limiting reactance that allow obtaining a predefined current transient reduction.

This selection may be performed using logical relations that allow selecting the values of limiting reactance that can be used in order to be closer to the real configuration of the PFC apparatus.

It should be noticed that also in this case, a practical approach has been chosen. The design of this important aspect of the PFC apparatus (i.e. the limiting reactance) can be run simply by the user. Requirements of the customer or other constraints can be easily satisfied.

The phase 6 of the method, according to the present invention, determines the basic structure of the PFC apparatus. At this point, it can be provided, in a preferred embodiment of the method according to the invention, the phase f) (reference 8) of executing, in the interactive computerised environment 2, an evaluation of the resonance conditions, related to the PFC apparatus when installed in the network.

The phase 8 is particularly relevant for avoiding problems when the apparatus has to be installed on the field.

In a preferred embodiment, data related to the capacitor banks are acquired from the results of phase 5 and/or 6 and, based on these data, the presence of natural resonance frequencies is checked. The following step provides the check of the presence of possible harmonic sources.

In a preferred embodiment of the method according to the present invention, it is advantageously provided the phase g) (reference 9) of executing, in the interactive computerised environment 2, an economical analysis related to the designed power factor controller apparatus. This phase is particularly important when it is necessary to prepare a proposal to the customer. For example, this phase might comprise the following steps of acquiring cost data related to the components of the power factor controller apparatus. Moreover, it might possible to provide an indication of the cost savings, due to the optimisation of the power quality of the network, obtained bu means of using the designed PFC apparatus. Further, it might be provided an evaluation of the costs related to the installation of the PFC apparatus. Finally, the step of evaluating the investment pay-back is advantageously be provided. This phase can be run easily because all the information, related to the PFC apparatus, is available in the computerised environment 2. Known formulas or relationships can be applied to the technical data produced in the previous phases. In this way, the customer can have all the elements, both technical and economical, for take the decision of commissioning the designed power factor controller apparatus. It should be stressed that the method according to the present invention allows this phase being an integral part of the design activity. This fact is particularly relevant, because it allows a further optimisation of the work-flow, needed for producing a proposal to the customer.

It has been proven in practice that the method according to the present invention allows achieving all the intended aims and objects.

In particular, it has been proven particularly effective in designing complicated power factor controller apparatus such as medium voltage switchboards and cubicles.

The method thus conceived is susceptible of numerous modifications and variations, all of which are within the scope of the inventive concept; all the details may furthermore be replaced with other technically equivalent elements.

What is claimed is:

1. A method for designing a power factor controller apparatus for a power distribution network, comprising the following phases:
   a) configuring an interactive computerised environment dedicated to management of data and/or programming commands in a predefined computerised support;
   b) acquiring data related to said power factor controller apparatus in said interactive computerised environment;
   c) acquiring and/or calculating data related to the power distribution network, wherein said power factor controller apparatus is installed in said interactive computerised environment, wherein said phase c) further comprises:
      acquiring data related to the rated frequency and/or voltage of said power distribution network;
      acquiring data related to a short circuit power factor value of the power distribution network;
      calculating at least one of a short circuit power, a short circuit current and a short circuit impedance value, related to the power distribution network;
   d) calculating an optimal tuning of a power factor target for said power factor controller apparatus, based on said phase c), in said interactive computerised environment;
   e) executing a basic design of said power controller apparatus based on phases c) and d) in said interactive computerised environment, wherein said phase e) further comprises:
      acquiring first data related to an optimal power factor target achievement, calculated in said phase d);
      acquiring second data related to available components related to said power factor controller apparatus based on said first data;
      executing a first basic engineering of said power factor controller apparatus based on said first and second data;
      calculating current transients related to said power factor controller apparatus; and
      executing an iterative procedure for optimising power factor controller apparatus based on said current transient calculation.

2. A method for designing a power factor controller apparatus according to claim 1, further comprising:
   f) executing an evaluation of resonance conditions related to said power factor controller apparatus based on one or more of said phases d) to e) in said interactive computerized environment.

3. A method for designing a power factor controller apparatus, according to claim 2, further comprising:
   g) executing an economical analysis related to said power factor controller apparatus based on one or more of said phases from c) to f) in said interactive computerised environment.

4. A method for designing a power factor controller apparatus according to claim 1, wherein said phase d) further comprises:
   acquiring said data related to said power distribution network, acquired and/or calculated in said phase c);

acquiring data/values related to a load profile and dynamic (active and/or reactive) power quantities;

executing a preliminary calculation of the power factor for said power factor controller apparatus based on said acquired data; and executing an iterative procedure for optimising the chasing of the target power factor controller apparatus based on the results of said preliminary calculation.

5. A method for designing a power factor controller apparatus according to claim 2, wherein said phase f) further comprises:

acquiring data related to capacitor banks used in said power factor controller apparatus;

checking for a presence of natural resonance frequencies in said power factor controller apparatus; and checking for a presence of possible harmonic sources in said power factor controller apparatus.

6. A method for designing a power factor controller apparatus, according to claim 3, wherein said phase g) further comprises:

acquiring cost data related to components of said power factor controller apparatus;

evaluating cost savings that can be obtained using said power factor controller apparatus;

evaluating costs for installation of said power controller apparatus; and evaluating pay-back of investments necessary for installing said power controller apparatus.

7. A method for designing a power factor controller apparatus according to claim 4, wherein said iterative procedure further comprises:

performing an approximation of reactive power characteristics related to said power factor controller apparatus by using a target function;

selecting an optimal number of capacitor banks used in said power factor controller apparatus based on said characteristic; and selecting an optimal sequence of capacitor banks, used in said power factor controller apparatus based on the previous steps.

8. A method for designing a power controller according to claims 1, wherein said calculating the current transients further comprises:

calculating first values of limiting reactance, related to a predefined capacitor bank considered in said basic design of the power factor controller apparatus, based on the reactance of the power distribution network and of said predefined capacitor bank;

calculating second values of limiting reactance, related to a predefined capacitor bank, based on the reactive power of said predefined capacitor bank and on the reactive power of the capacitor banks connected with said predefined capacitor bank; and selecting, among said first and second values of limiting reactance related to said predefined capacitor bank, the values that obtain a predefined current transient reduction.

9. A method for designing a power factor controller apparatus according to claim 1, wherein said power factor controller apparatus is a medium voltage switchboard.

10. A method for designing a power factor controller according to claim 2, wherein said phase d) further comprises:

acquiring said data related to said power distribution network acquired and/or calculated in said phase c);

acquiring data/values related to a load profile and dynamic (active and/or reactive) power quantities;

executing a preliminary calculation of the power factor for said power factor controller apparatus based on said acquired data; and executing an iterative procedure for optimising the tuning of the target power factor of said power factor controller apparatus based on results of said preliminary calculation.

11. A method, according to claim 2, wherein said phase d) further comprises:

acquiring said data related to said power distribution network, acquired and/or calculated in said phase c);

acquiring data/values related to the load profile and dynamic (active and/or reactive) power quantities);

executing a preliminary calculation of the power factor for said power factor controller apparatus based on said acquired data; and executing an iterative procedure for optimising tuning of the target power factor of said power factor controller apparatus based on the results of said preliminary calculation.

12. A power factor controller apparatus that is designed using a method according to claim 1.

* * * * *